2,726,217

NITRATED POLY-PARA-XYLENE

James K. Hubbard, West Chester, Pa., assignor to E. I. du Pont de Nemours and Company, Wilmington, Del., a corporation of Delaware No Drawing. Application February 25, 1953,
Serial No. 338,879

6 Claims. (Cl. 260—2)

This invention relates to a novel chemical compound and to a process for its preparation. More specifically, it relates to a polymer having recurring units of the structure:

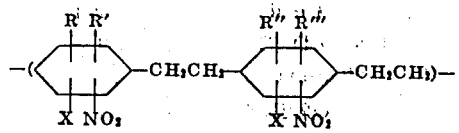

wherein R, R', R" and R'" represent a member of the class consisting of nuclear hydrogen and methyl, X represents a member of the class consisting of —NO₂ and R, R', R" and R'". The hexagon represents the benzene nucleus.

It is an object of the present invention to prepare a nitration product of poly-p-xylene and/or its nuclear substituted derivatives.

Another object is to provide a novel, explosive composition comprising nitrated poly-p-xylene and/or its nuclear substituted derivatives.

A further object is to provide a process for the nitration of poly-p-xylene and/or its nuclear substituted derivatives.

These and other objects will become apparent in the course of the following specification and claims.

In accordance with the present invention, it has been found that a novel polymer having recurring units of the type defined above can be prepared by the nitration of poly-p-xylene and/or its nuclear substituted derivatives. Preparation of poly-p-xylene is described in British Patent No. 650,947. The nitration is accomplished with nitric acid or a mixture of nitric and sulfuric acids as defined hereinafter. An average of two nitro groups per benzene nucleus can be introduced using fuming nitric acid.

The product is useful in the preparation of other compounds, such as by reduction to the amine, and also as a cast film, as a solid fuel and the like.

The following examples are cited to illustrate the invention. They are not intended to limit it in any manner.

Example I

Two hundred milliliters of fuming nitric acid (90%) is placed in a 500 ml. three-necked flask equipped with a stirrer and thermometer. Poly-p-xylene (5 grams ground to pass through a 20-mesh screen) is added portionwise so that the temperature of the reaction mixture does not exceed 45–50° C. The mixture becomes quite dark initially but the color fades to a light amber as the polymer dissolves. Solution is complete in about an hour. Stirring is continued for about 3 hours. The solution is then suction-filtered through a sintered-glass funnel. The filtrate is poured onto 500 g. of ice and water. A precipitate forms. It is suction-filtered, thoroughly washed with water, and dried in a vacuum oven at 70° C. Analysis establishes the presence of an average of about two nitro groups per benzene nucleus.

The product is a light tan powder. It melts with partial decomposition at about 220° C. and spontaneously ignites with explosive violence at about 282° C. It is a high explosive comparable in strength to trinitrotoluene. It has a sensitivity to friction comparable to cyclotrimethylene trinitramine. For reasons of safety, it is stored in small quantities under water. It is soluble at room temperature in nitrobenzene, dimethylformamide, tetramethylene sulfone and cyclohexanone. Films may be dry cast from such solutions as is illustrated below.

Example II

The product of Example I is dissolved in cyclohexanone to form a 10% solution. Dry-casting of the solution produces a brittle, yellow-brown film.

Example III

Two-hundred eighteen grams of mixed acids (i. e. a 2:3 parts by weight mixture of concentrated nitric and sulfuric acids) are cooled to 5° C. Ten grams of poly-p-xylene are slowly stirred in to form a slurry. No temperature rise is noted. Stirring is continued at this temperature for six hours. A sligl. darkening of the suspended particles is observed. After filtration, the collected polymer is washed well with water and dried under vacuum at 70° C. A light brown product results. Analysis of that fraction of product which passes through a 40-mesh screen indicates that it contains an average of about one nitro group per benzene ring. It is only partially soluble in dimethylformamide, tetramethylene sulfone and cyclohexanone.

Example IV

A nitration, similar to that of Example III, is performed at a temperature controlled within the limits of 70–75° C. using a mixed acid having concentrated nitric and sulfuric acids mixed in parts by weight in a proportion of 1:5. The product analyzes to a nitro content of about one per monomer unit.

Control of reaction conditions is facilitated by grinding the polymeric starting material prior to subjecting it to the nitrating medium. Furthermore, the speed and uniformity of the reaction is increased as particle size is decreased. It is preferred to use particles which will pass through a screen having a mesh within the limits of about 10 to about 40. The 40-mesh particles are particularly adaptable. However, polymer feed as flake or even as sheet may be employed.

The period required for complete nitration will vary depending on such factors as the particle size of the feed polymer as pointed out above, the relative proportion of the reactants, the strength of the nitrating medium and the reaction temperature. As a general rule, nitric acid is employed in large excess. The use of the large body of liquid is also a factor which assists in the dissipation of the heat of reaction. For laboratory preparations, the use of from 50 to 100 times the theoretical quantity of acid has been found convenient. A larger excess may be employed without deleterious effects. Due to recovery problems, less of an excess acid is recommended for commercial operation.

The nitrating agent is preferably fuming (90%) nitric acid or a mixture of nitric and sulfuric acids in a proportion of about 2:3. The fuming nitric acid is particularly desirable in this role since it dissolves the nitrated polymer. Weaker nitrating agents, such as concentrated nitric acid and mixed nitric and sulfuric acids in a proportion of 1:5 may be employed.

Preferably, the reaction temperature is maintained at around room temperature. This may be regulated in part by adjustment of the rate of addition of the polymer feed to the nitrating bath. Cooling facilities are necessary to forestall runaway exothermic phenomena. The reaction will proceed at temperatures around 2° to 5° C. For safety purposes, it is preferred to maintain the reaction mass below about 45° C. Completion of the reaction is indicated when the reaction mass ceases to generate heat.

In mixing the reaction components, it is preferred to add the polymer to the nitrating bath slowly, either continuously or in small increments. Such a procedure assists in control of heat transfer especially in the handling of large quantities.

While the invention has been particularly described with reference to nitro and polynitro derivatives of poly-p-xylene, it is obvious that similar derivatives of polymers related to poly-p-xylene and which have available hydrogen in the benzene ring can likewise be prepared. Those derivatives containing methyl substituents in the benzene ring such as polypseudocumene, polydurene, and the copolymers of p-xylene with pseudocumene and durene are of particular interest.

While the invention is broadly directed to all nitro derivatives of poly-p-xylene and/or its nuclear substituted derivatives, the preferred species is that containing two nitro groups per benzene ring. In the preparation of the lower nitrated polymer, the reaction may be stopped at any intermediate stage to produce a product possessing any average degree of nitration desired. Alternately the strength of the nitrating medium may be lowered to accomplish the same result.

Many other modifications within the spirit of the invention will be apparent to those skilled in the art without a departure from the inventive concept.

What is claimed is:
1. A nitro poly-p-xylene.
2. A polymer having recurring units of the structure:

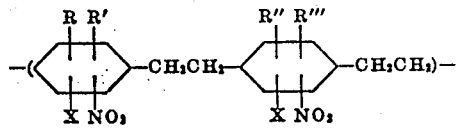

wherein R, R', R" and R'" represent a member of the class consisting of nuclear hydrogen and methyl, and X represents a member of the class consisting of —NO$_2$ and R, R', R" and R'".
3. A nitro poly-methyl-substituted-p-xylene.
4. Polynitro-poly-p-xylene.
5. Poly-dinitro-p-xylene.
6. As an article of manufacture, a film of poly-dinitro-p-xylene.

References Cited in the file of this patent
UNITED STATES PATENTS
2,572,420  Zenftman _____ Oct. 23, 1951
FOREIGN PATENTS
650,947  Great Britain _____ Mar. 7, 1951